United States Patent
Peng

(10) Patent No.: US 10,368,276 B2
(45) Date of Patent: Jul. 30, 2019

(54) CELL HANDOVER METHOD, BASE STATION, AND CONTROL NODE

(71) Applicant: HUAWEI TECHNOLOGIES CO., LTD., Shenzhen, Guangdong (CN)

(72) Inventor: Jindong Peng, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/198,146

(22) Filed: Nov. 21, 2018

(65) Prior Publication Data
US 2019/0098541 A1    Mar. 28, 2019

Related U.S. Application Data

(63) Continuation of application No. PCT/CN2016/083285, filed on May 25, 2016.

(51) Int. Cl.
*H04W 36/00* (2009.01)

(52) U.S. Cl.
CPC ....... *H04W 36/0083* (2013.01); *H04W 36/00* (2013.01); *H04W 36/0016* (2013.01)

(58) Field of Classification Search
CPC .................................................. H04W 36/0016
USPC .......................................................... 455/437
See application file for complete search history.

(56) References Cited

U.S. PATENT DOCUMENTS

| | | | | |
|---|---|---|---|---|
| 2012/0287800 | A1* | 11/2012 | Siomina | H04W 64/003 370/252 |
| 2016/0150453 | A1* | 5/2016 | Narayanan | H04W 36/0061 455/436 |

FOREIGN PATENT DOCUMENTS

EP    2966903 A1    1/2016

OTHER PUBLICATIONS

International Search Report dated Feb. 15, 2017 in corresponding International Application No. PCT/CN2016/083285.
LG Electronics Inc.,"Simplified sequence of inbound mobility to H(e)NB", R2-095600, 3GPP TSG-RAN2 Meeting #67bis, XP050390117, Miyazaki, Japan, Oct. 12-17, 2009, total 9 pages.
Motorola, "PCID Confusion Resolution Without Gaps", R2-093923, 3GPP TSG-RAN WG2#66bis XP050604584, Jun. 29-Jul. 3, 2009, Los Angeles, U.S.A., 5 pages.
Extended European Search Report dated Jan. 7, 2019 in corresponding European Patent Application No. 16902677.0.

* cited by examiner

*Primary Examiner* — Chuck Huynh
(74) *Attorney, Agent, or Firm* — Staas & Halsey LLP

(57) ABSTRACT

The present invention discloses a cell handover method. The method includes: a first base station receives a handover request sent by the UE, where the handover request is used to indicate that the UE requests to be handed over to a target second cell of the at least two second cells, and the handover request carries a physical cell identifier PCI of the target second cell. The first base station determines the PCI is corresponding to a plurality of second cells and receives location information of the UE sent by a target second base station of the at least two second base stations that is corresponding to the target second cell, where the location information is obtained by the target second base station based on configuration information; and then determines the target second cell from the plurality of second cells based on the location information.

8 Claims, 6 Drawing Sheets

CELL HANDOVER METHOD, BASE STATION, AND CONTROL NODE

CROSS-REFERENCE TO RELATED APPLICATIONS

This application is a continuation of International Application No. PCT/CN2016/083285, filed on May 25, 2016, the disclosure of which is hereby incorporated by reference in its entirety.

TECHNICAL FIELD

The present invention relates to the communications field, and more to a cell handover method, a base station, and a control node.

BACKGROUND

As specified in a Long Term Evolution (LTE) protocol, user equipment (UE) needs to report a physical cell identifier (PCI) of a target cell to a serving base station (or a source base station) during a handover process. The serving base station determines the target cell based on the PCI of the target cell reported by the UE, and sends a handover instruction to implement cell handover. However, in an existing LTE system, there are limited PCI resources. The LTE system provides only 504 PCIs. Consequently, in actual application, different neighboring cells of a cell may share a PCI, that is, PCI confusion occurs. In this case, when the serving base station receives a PCI of a target cell reported by the UE, if the reported PCI is corresponding to a plurality of neighboring cells, the serving base station cannot select a correct target cell for the UE based on the PCI. In other words, the serving base station cannot correctly select, from the plurality of neighboring cells with the same PCI, the target cell to which the UE needs to be handed over.

In other implement, to resolve a PCI confusion problem of the UE in a handover process, the base station configures a parameter for the UE to read a cell global identity (CGI) of the target cell. Because a CGI can uniquely identify a cell, the base station can correctly select, from cells with a same PCI by obtaining the CGI of the target cell, the target cell to which the UE needs to be handed over.

However, CGI reading needs to be enabled for the UE by the base station after the UE reports a measurement report. Because additional signaling exchange is required, a cell handover delay is increased.

SUMMARY

This application provides a cell handover method, a base station, and a control node, so that when PCI confusion occurs, a target cell can be determined and a cell handover can be implemented, without increasing a delay.

According to a first aspect, this application provides a cell handover method, which is applied to a communications system including a first base station, at least two second base stations, and user equipment UE, where the first base station is corresponding to a first cell, the first cell is a serving cell of the UE, the at least two second base stations are corresponding to at least two second cells, the at least two second cells are neighboring cells of the first cell, the at least two second cells are in one-to-one correspondence with at least two cell global identities CGIs, each CGI is used to uniquely identify a corresponding second cell in the communications system, each second base station stores configuration information, the configuration information is used to indicate a time-frequency resource used when the UE sends a sounding reference signal SRS to the first base station, and the method includes: receiving, by the first base station, a handover request sent by the UE, where the handover request is used to indicate that the UE requests to be handed over to a target second cell of the at least two second cells, and the handover request carries a physical cell identifier PCI of the target second cell; determining, by the first base station, that the PCI is corresponding to a plurality of second cells; receiving, by the first base station, location information of the UE sent by a target second base station of the at least two second base stations that is corresponding to the target second cell, where the location information is obtained by the target second base station based on the configuration information; and determining, by the first base station, the target second cell from the plurality of second cells based on the location information.

In other implement, after UE reports a PCI of a target cell to a source base station (or a current serving base station), if PCI confusion occurs, the source base station configures a parameter for the UE to read a CGI of the target cell. Because the CGI can uniquely identify a cell globally, after obtaining the CGI of the target cell, the source base station can uniquely determine the target cell without causing confusion. However, in a process in which the serving base station enables CGI reading, additional signaling exchange is required, and consequently a handover delay is increased.

In this embodiment of the present invention, a serving base station sends, to the target base station (that is, the base station to which the UE needs to be handed over), the configuration information of the time-frequency resource used when the UE sends an uplink sounding reference signal SRS to the serving base station, so that the target base station can perform, on the time-frequency resource indicated by the configuration information, detection on the SRS signal sent by the UE to the serving base station. If the UE can detect the signal, the UE obtains the location information "the UE is approaching" of the UE, and reports the information of the UE to the serving base station, so that the base station participates in determining a location of the user equipment UE. Therefore, the serving base station can learn of the target cell that the UE is approaching. In this way, the serving base station can determine the target cell to which the UE needs to be handed over, without needing to configure a parameter for the UE to read the CGI of the target cell. Compared with the other implement, no additional signaling exchange is required, and a delay is reduced.

Optionally, in a first implementation of the first aspect, the location information carries a CGI of the target second cell, and the determining, by the first base station, the target second cell from the plurality of second cells based on the location information includes: determining, by the first base station, the target second cell from the plurality of second cells based on the CGI.

Optionally, in a second implementation of the first aspect, before the receiving, by the first base station, location information of the UE sent by a target second base station of the at least two second base stations that is corresponding to the target second cell, the method further includes: sending, by the first base station, configuration information to the target second base station, so that the target second base station obtains the location information of the UE based on the configuration information, and sends the location information to the first base station.

According to a second aspect, this application provides a cell handover method, applied to a communications system including a first base station, at least two second base stations, and user equipment UE, where the first base station is corresponding to a first cell, the first cell is a serving cell of the UE, the at least two second base stations are corresponding to at least two second cells, the at least two second cells are neighboring cells of the first cell, the at least two second cells are in one-to-one correspondence with at least two cell global identities CGIs, each CGI is used to uniquely identify a corresponding second cell in the communications system, each second base station stores configuration information, the configuration information is used to indicate a time-frequency resource used when the UE sends a sounding reference signal SRS to the first base station, and the method includes: obtaining, by a target second base station of the at least two second base stations, location information of the UE based on the configuration information; and sending, by the target second base station, the location information to the first base station, so that after receiving a handover request sent by the UE, the first base station determines, based on the location information from a plurality of second cells corresponding to a physical cell identifier PCI of a target second cell carried in the handover request, the target second cell to which the UE needs to be handed over, where the target second cell is a base station of the at least two second base stations that is corresponding to the target second cell.

Optionally, in a first implementation of the second aspect, the location information carries a CGI of the target second cell, so that the first base station determines, based on the CGI, the target second cell from the plurality of second cells corresponding to the PCI.

Optionally, in a second implementation of the second aspect, before the obtaining, by a target second base station of the at least two second base stations, location information of the UE, the method further includes: receiving, by the target second base station, configuration information sent by the first base station; and the obtaining, by a target second base station, location information of the UE based on the configuration information includes: performing, by the target second base station, SRS signal detection on a time-frequency resource indicated by the configuration information; and when the target second base station detects an SRS signal on the time-frequency resource, obtaining, by the target second base station, the location information of the UE.

According to a third aspect, a cell handover method is provided, applied to a communications system including a control node, a first base station, at least two second base stations, and user equipment UE, where the first base station is corresponding to a first cell, the first cell is a serving cell of the UE, the at least two second base stations are corresponding to at least two second cells, the at least two second cells are neighboring cells of the first cell, the at least two second cells are in one-to-one correspondence with at least two cell global identities CGIs, each CGI is used to uniquely identify a corresponding second cell in the communications system, each second base station stores configuration information, the configuration information is used to indicate a time-frequency resource used when the UE sends a sounding reference signal SRS to the first base station, and the method includes: obtaining, by the control node, a handover request, where the handover request is used to indicate that the UE requests to be handed over to a target second cell of the at least two second cells, and the handover request carries a physical cell identifier PCI of the target second cell; determining, by the control node, that the PCI is corresponding to a plurality of second cells; obtaining, by the control node, location information of the UE; and determining, by the control node, the target second cell from the plurality of second cells based on the location information.

Optionally, in a first implementation of the third aspect, the location information carries a CGI of the target second cell, and the determining, by the control node, the target second cell from the plurality of second cells based on the location information includes: determining, by the control node, the target second cell from the plurality of second cells based on the CGI.

Optionally, in a second implementation of the third aspect, the control node is an access gateway (AG).

According to a fourth aspect, this application provides a base station, configured to perform the method in any one of the first aspect or the possible implementations of the first aspect. The base station includes a unit configured to perform the method in any one of the first aspect or the possible implementations of the first aspect.

According to a fifth aspect, this application provides a base station, configured to perform the method in any one of the second aspect or the possible implementations of the second aspect. The base station includes a unit configured to perform the method in any one of the second aspect or the possible implementations of the second aspect.

According to a sixth aspect, this application provides a control node, configured to perform the method in any one of the third aspect or the possible implementations of the third aspect. The control node includes a unit configured to perform the method in any one of the third aspect or the possible implementations of the third aspect.

According to a seventh aspect, this application provides a base station, where the base station includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. When the processor executes the instruction stored in the memory, the execution causes the processor to execute the method in any one of the first aspect or the possible implementations of the first aspect.

According to an eighth aspect, this application provides a base station, where the base station includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. When the processor executes the instruction stored in the memory, the execution causes the processor to execute the method in any one of the second aspect or the possible implementations of the second aspect.

According to a ninth aspect, this application provides a control node, where the control node includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. When the processor executes the instruction stored in the memory, the execution causes the processor to execute the method in any one of the third aspect or the possible implementations of the third aspect.

According to a tenth aspect, this application provides a computer readable medium, configured to store a computer program, where the computer program includes an instruction used to execute the method in any one of the first aspect or the possible implementations of the first aspect.

According to an eleventh aspect, this application provides a computer readable medium, configured to store a computer program, where the computer program includes an instruction used to execute the method in any one of the second aspect or the possible implementations of the second aspect.

According to a twelfth aspect, this application provides a computer readable medium, configured to store a computer program, where the computer program includes an instruction used to execute the method in any one of the third aspect or the possible implementations of the third aspect.

In the technical solution provided in this application, the base station participates in determining the location of the user equipment, so that when target cell PCI confusion occurs, the base station can determine, based on the location information of the user equipment, the target cell from the plurality of cells with the same PCI and implement a handover, without increasing a delay.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
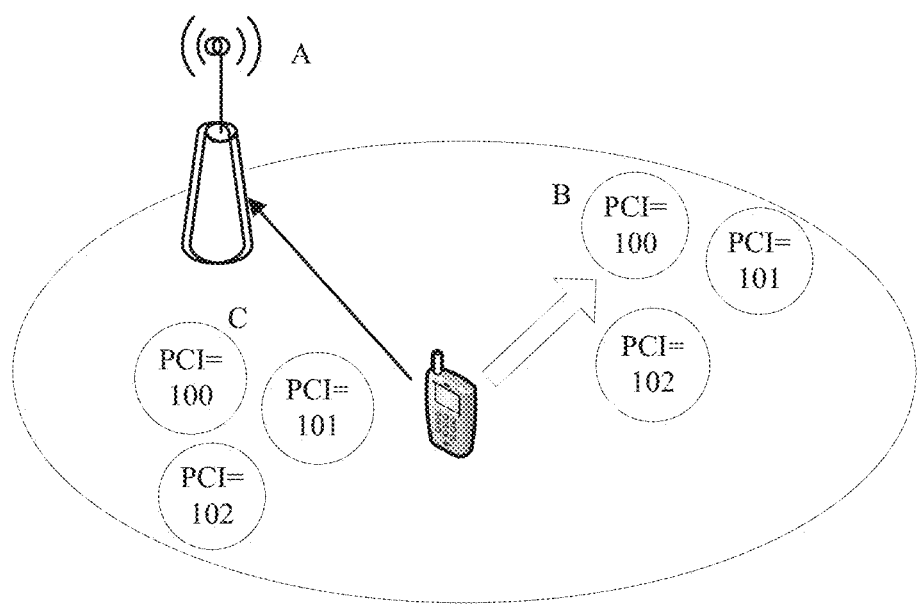
FIG. 1 is a schematic diagram of an application scenario to which a cell handover method in an embodiment of the present invention may be applied.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex FDD) system, an LTE time division duplex (TDD) system, and a Universal Mobile Telecommunications System (UMTS).

It should also be understood that in the embodiments of the present invention, user equipment (UE) may be referred to as a terminal, a mobile station MS), a mobile terminal, and the like. The user equipment may communicate with one or more core networks through a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present invention, a base station may be a base transceiver station (BTS) in GSM or CDMA, may be a NodeB (NodeB, NB) in WCDMA, or may be an evolved NodeB (eNB or e-NodeB) in LTE. This is not limited in the present invention.

It should also be understood that a handover method in the embodiments of the present invention is applicable to handover of UE between macro base stations, handover of UE between micro base stations, and handover of UE between a macro base station and a micro base station. For ease of understanding and description, in the embodiments of the present invention, only that UE is handed over from a macro base station to a micro base station is used as an example, to describe the cell handover method in the embodiments of the present invention.

In the embodiments of the present invention, a first base station may be a macro base station, and correspondingly, a first cell may be a macro cell. A second base station may be a micro base station, a pico base station, a femto base station, or the like. Correspondingly, a second cell may be a micro cell, a pico cell, or a femto cell. This is not limited in the embodiments of the present invention.

It should be noted that, in the embodiments of the present invention, the numbers "first" and "second" are merely used to distinguish between different objects, for example, to distinguish between different base stations or cells, and should not constitute any limitation on the protection scope of the embodiments of the present invention.

FIG. 1 shows an application scenario to which a cell handover method in an embodiment of the present invention may be applied. As shown in FIG. 1, there is a macro base station A, and a plurality of (six in FIG. 1) micro base stations in the scenario. The macro base station is corresponding to one cell (for ease of distinguishing and description, hereinafter referred to as a macro cell). Each micro base station is corresponding to one cell and is within a coverage area of the macro cell. Physical cell identifiers (PCIs) of a micro base station B and a micro base station C are both 100.

It should be noted that a PCI includes a primary synchronization signal (PSS) and a secondary synchronization signal (SSS). In LTE, a terminal distinguishes between wireless signals based on different PCIs. In the existing LTE, a total of 504 PCIs are provided, with values ranging from 0 to 503.

Usually, PCIs need to be planned in an area based on an actual situation, and then configured for base stations. When the PCIs are properly planned, it may be ensured that each cell in the area uses a different PCI. However, if the PCIs are not properly planned, PCI confusion may occur.

It should be understood that the PCI confusion means that two or more intra-frequency cells in neighboring cells of a cell use a same PCI, and consequently a serving cell cannot distinguish between these neighboring cells (that is, cells that are adjacent to a serving cell).

Figure 2:
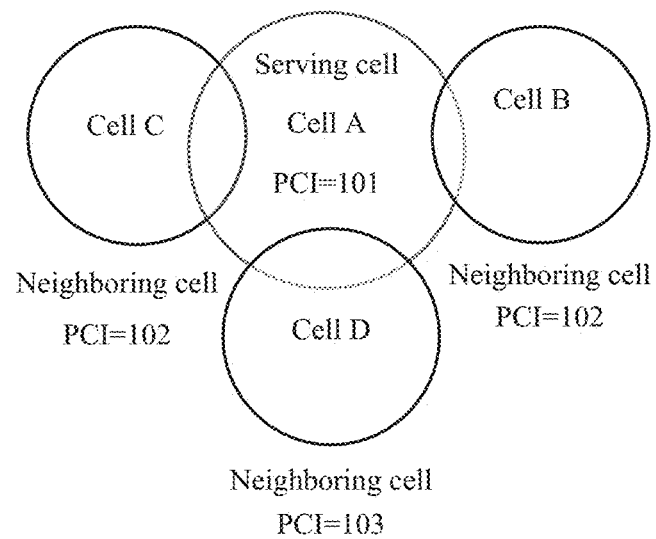
FIG. 2 is a schematic diagram of PCI confusion.

FIG. 2 is a schematic diagram of PCI confusion. As shown in FIG. 2, assuming that a current serving cell of user equipment UE is a cell A, and the cell A has three neighboring cells: a cell B, a cell C, and a cell D. A PCI value of the cell A is 101, PCI values of the cell B and the cell C are both 102, and a PCI value of the cell D is 103. In an LTE protocol, in a handover process, the UE may first perform measurement on a plurality of neighboring cells of the serving cell, so as to select a target cell from the plurality of neighboring cells, and report a PCI of the target cell to a base station. The serving base station determines, based on the PCI of the target cell sent by the UE, the target cell from the plurality of neighboring cells, so that the UE is handed over from the serving cell to the target cell. In FIG. 2, assuming that the target cell selected by the UE is the cell B, the PCI of the target cell reported by the UE to the serving base station is 102. However, merely based on the PCI, the serving base station cannot determine whether the target cell to which the UE needs to be handed over is the cell B or the cell C. This case is referred to as PCI confusion.

In other implement, when PCI confusion occurs, two manners are used to allow the serving base station to correctly determine the target cell to which the UE needs to be handed over. One manner is as follows: In a neighboring cell management process of an eNB, if the eNB finds itself having two neighboring cells with a same PCI, the eNB triggers an alarm. The eNB instructs, by using the alarm, management personnel to manually modify the PCI or reallocate a PCI. Obviously, this manner requires high labor costs. In addition, PCI modification may affect existing network planning. The other manner is as follows: In a handover process, if PCI confusion occurs, the serving base station configures a parameter for the UE to read a CGI. The CGI is a cell global identity of a cell and can uniquely identify the cell. Therefore, by reading the CGI, a cell identifier ID of the target cell and an identifier ID of the eNB can be obtained, so that the target cell is found. However, to read a CGI, the serving base station needs to configure a parameter for the UE after receiving a measurement report sent by the UE. This increases a delay, brings a call drop risk, and affects user experience. In addition, to read the CGI, the UE needs to be configured to a discontinuous reception (DRX) mode. However, DRX may be interrupted, that is, this may risk a reading failure and cause a handover failure. It may be learned that in the existing technical solutions for PCI confusion, additional signaling exchange processes are required, and a handover delay is increased.

In this embodiment of the present invention, the cell handover method may be applied to a plurality of scenarios. For example, in an intra-frequency macro and micro coverage scenario without a control node (that is, a scenario 1), there is one macro base station and a plurality of micro base stations, and a relatively large quantity of neighboring cells. For another example, in an intra-frequency macro and micro coverage scenario with a control node (that is, a scenario 2), there is one macro base station and a plurality of micro base stations, and a relatively large quantity of neighboring cells.

Figure 3:
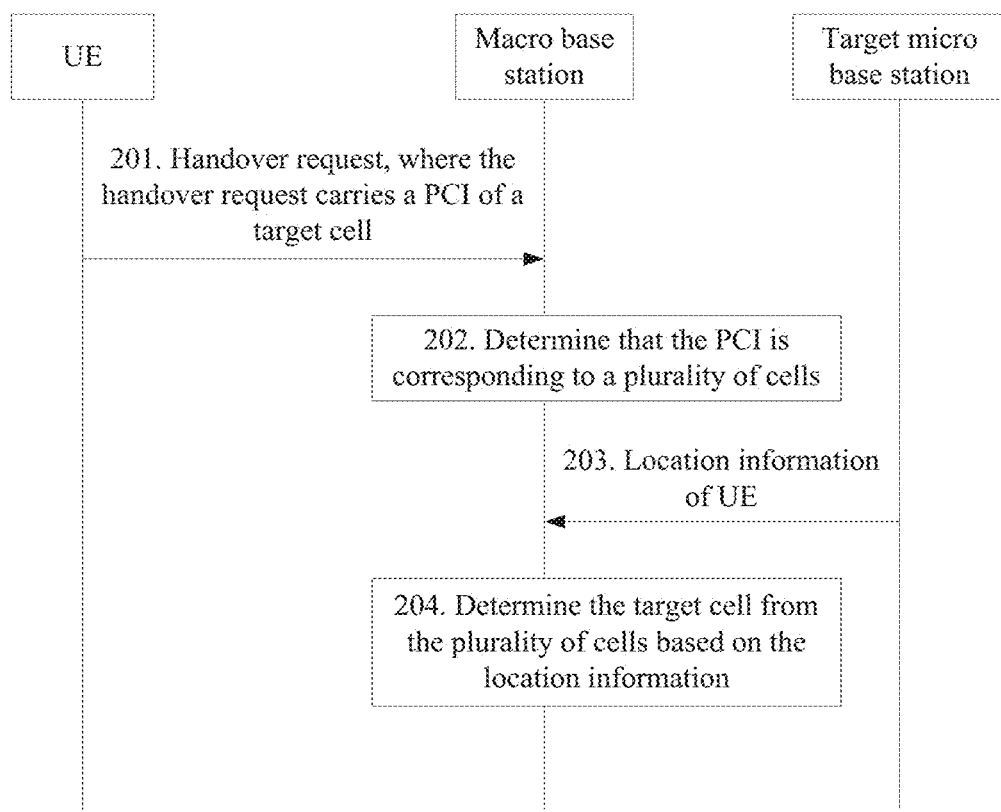
FIG. 3 is a schematic interaction diagram of a cell handover method according to an embodiment of the present invention.
Figure 4:
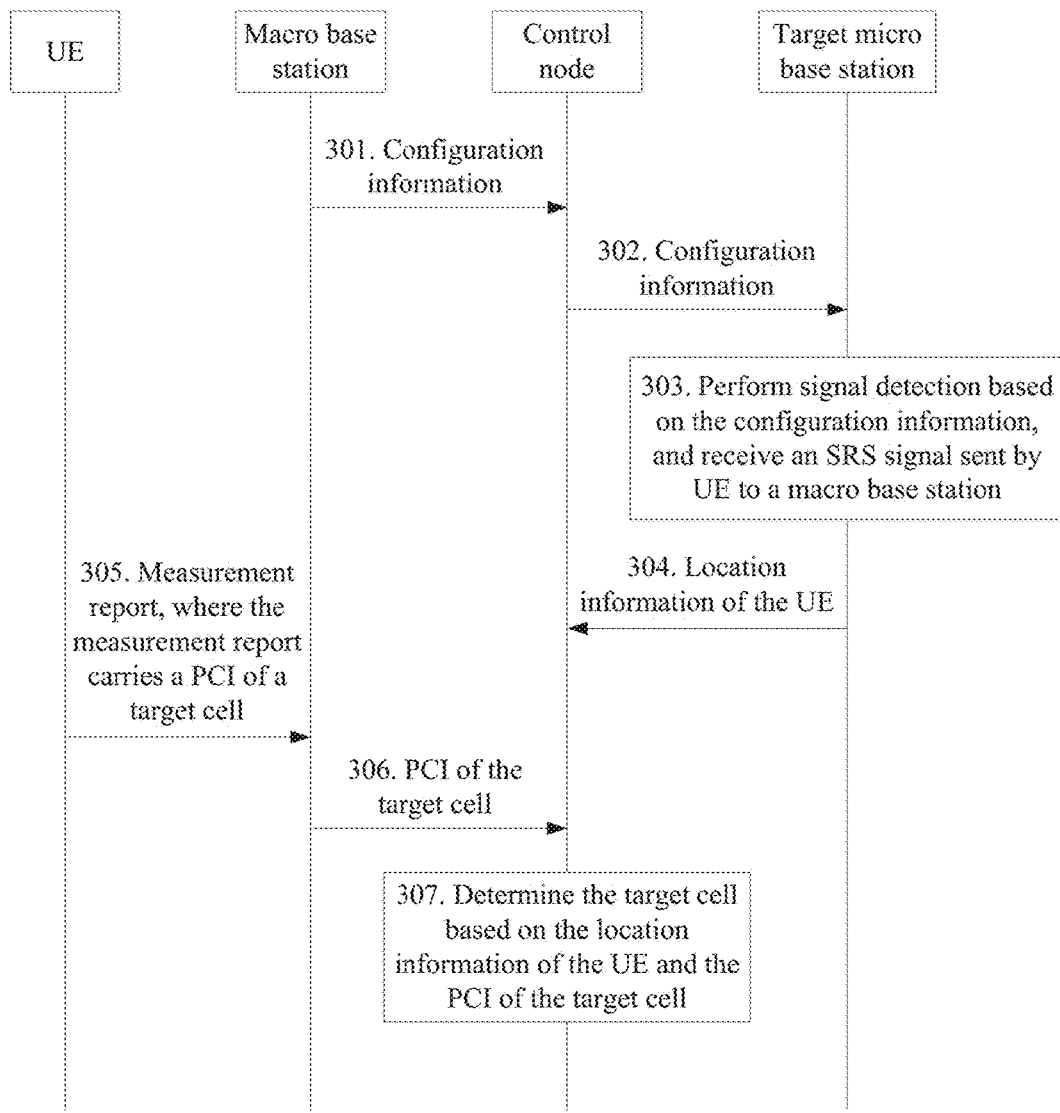
FIG. 4 is a schematic interaction diagram of a cell handover method according to another embodiment of the present invention.

With reference to FIG. 3 and FIG. 4, the following details application of the cell handover method in this embodiment of the present invention in the scenario 1 and the scenario 2.

Scenario 1:

FIG. 3 is a schematic interaction diagram of a cell handover method according to an embodiment of the present invention. As shown in FIG. 3, the method includes the following steps.

201. A macro base station receives a handover request sent by UE, where the handover request carries a PCI of a target second cell.

After performing cell measurement, the UE determines a PCI of a target cell to which the UE is to be handed over. Then, the UE sends a handover request to a serving base station, and reports a measurement result to the serving base station. A process in which the UE performs cell measurement and reports the measurement result may be the same as that in the other implement. For brevity, details are not described herein.

The macro base station (that is, an example of a first base station) receives the handover request sent by the UE, where the handover request is used to indicate that the UE requests to be handed over from a serving cell to the target cell, and the handover request carries the PCI of the target cell.

202. The macro base station determines that the PCI is corresponding to a plurality of second cells.

Referring to the application scenario shown in FIG. 1, if the PCI of the target cell carried in the handover request is 100, there are two cells whose PCIs are 100, that is, cells corresponding to the micro base station B and the micro base station C. In this case, the macro base station cannot determine, based on PCI=100, whether the target cell to which the UE needs to be handed over is a cell corresponding to the micro base station B or a cell corresponding to the micro base station C.

203. The macro base station receives location information of the UE sent by a target micro base station.

It should be understood that the target micro base station herein is a micro base station corresponding to the target cell in a plurality of neighboring cells within a coverage range of the macro base station.

The location information of the UE is obtained by the target micro base station (that is, an example of a target second base station) based on configuration information. The configuration information is used to indicate a time-frequency resource used when the UE sends a sounding reference signal (SRS) to the macro base station.

Optionally, in this embodiment of the present invention, each micro base station stores the configuration information. Based on the time-frequency resource (for ease of distinguishing and understanding, hereinafter referred to as a time-frequency resource #A) indicated by the configuration information, all micro base stations perform SRS signal detection on the time-frequency #A.

If the micro base station C cannot detect an SRS signal on the time-frequency resource #A, it indicates that "the UE has left" or "the UE is still far away". Therefore, the cell to which the UE needs to be handed over is not the cell corresponding to the micro base station C.

If the micro base station B receives an SRS signal on the time-frequency resource #A, it indicates that "the UE is approaching" or "the UE has been in a cell corresponding to the micro base station B". In this case, the micro base station B obtains the location information of the UE.

Optionally, before receiving the location information sent by the micro base station, the macro base station may also send the configuration information to all micro base stations.

In this embodiment of the present invention, the configuration information may be pre-stored by the micro base station, or may be sent by the macro base station to each micro base station after the macro base station receives the handover request of the UE. In this way, each micro base station may perform signal detection based on the time-frequency resource indicated by the configuration information, so as to determine whether the UE is approaching the micro base station.

It should be noted that, for brevity, only the target micro base station is shown in the schematic interaction diagram in FIG. 3. Actually, in this embodiment of the present invention, the macro base station sends the configuration information to all micro base stations in a coverage area of a macro cell. For example, in FIG. 2, a base station corresponding to the cell A sends configuration information to base stations corresponding to all neighboring cells (that is, the cell B, the cell C, and the cell D). In other words, the base stations respectively corresponding to the cell B, the cell C, and the cell D receive the configuration information, and perform SRS signal detection on a time-frequency resource indicated by the configuration information.

It should also be noted that in this embodiment of the present invention, description is provided by using only an example in which the macro base station sends configuration information of one UE. It may be understood that when there is a plurality of UEs in the coverage area of the macro cell corresponding to the macro base station, the configuration information generated by the macro base station includes time-frequency resources used when the plurality of UEs send SRS information to the macro base station.

In this embodiment of the present invention, the configuration information is generated (or configured) by the macro base station. In addition, a process in which the macro base station generates the configuration information is the same as that in the other implement. Details are not described herein.

It should be noted that, in this embodiment of the present invention, the location information of the UE is information that "the UE is approaching".

It should be understood that after a micro base station receives, on the time-frequency resource, an SRS signal sent by the UE to the macro base station, the micro base station may learn of, by decoding the SRS signal, the UE sending the SRS signal. In other words, in this embodiment of the present invention, the macro base station may configure different time-frequency resources for different UEs, so that each UE uses a time-frequency resource different from that used by any other UE. The macro base station sends configuration information to each micro base station. The micro base station performs SRS signal detection based on a time-frequency resource indicated by the configuration information. When a micro base station receives an SRS signal on a time-frequency resource, the micro base station may learn of, based on a correspondence between UE and a time-frequency resource, UE sending the SRS signal on the time-frequency resource, and then send location information of the UE to the macro base station. Alternatively, the macro base station may configure a same time-frequency resource for different UEs, and distinguish between different UEs in a code division manner. In this way, the micro base station may determine, by decoding the received SRS signal, the UE sending the SRS signal, and send the location information of the UE to the macro base station.

204. The macro base station determines, based on the location information, a target cell from a plurality of cells corresponding to a PCI reported by the UE.

After receiving the location information of the UE sent by the micro base station B, the macro base station may learn that a micro base station that the UE is approaching is the micro base station B. Therefore, the target cell to which the UE needs to be handed over is a cell corresponding to the micro base station B. In this way, the macro base station can determine, from the micro base station B and the micro base station C, that the target micro base station is the micro base station B, not the micro base station C. In other words, once the micro base station B is determined, it is determined that a cell corresponding to the micro base station B is the target cell.

It should be understood that, in this embodiment of the present invention, if a plurality of micro base stations simultaneously detect the SRS signal sent by the UE to the macro base station, and send the location information of the UE to the macro base station, the macro base station may select, from the plurality of cells based on strength, quality, or the like of the SRS signal received by each micro base station, the target cell to which the UE needs to be handed over.

For example, still referring to FIG. 1, it is assumed that both the micro base station B and the micro base station C detect the SRS signal sent by the UE to the macro base station, and send location information that "the UE is approaching" to the macro base station. In this case, the location information sent to the macro base station by the micro base station B and the micro base station C carries strength, quality, or the like of the received SRS signal. It may be understood that, because the UE is continuously approaching the micro base station B, in comparison, strength of the SRS signal received by the micro base station B should be greater than strength of the SRS signal received by the micro base station C. In this case, the macro base station may also determine, from the micro base station B and the micro base station C with reference to the strength, quality, and the like of the SRS signals received by the micro base stations, the micro base station B that receives the SRS signal with greater strength, as the target micro base station. In this way, the target cell is determined.

Optionally, in an embodiment, the location information carries a CGI of the target cell.

In this embodiment of the present invention, when the target base station sends the location information of the UE to the macro base station, the CGI of the target cell may be carried in the location information. In this way, after receiving the CGI of the target cell sent by the target base station, the macro base station may determine the target cell from the plurality of cells with the same PCI based on the CGI of the target cell.

It should be noted that a CGI is a cell global identity, and can uniquely identify a cell. After receiving the CGI of the target cell, the macro base station may determine a unique target cell from the plurality of cells.

According to the cell handover method in this embodiment of the present invention, the base station participates in determining a location of the user equipment, so that in the case of target cell PCI confusion, the base station can determine, based on the location information of the user equipment, the target cell from the plurality of cells with the same PCI, to complete handover. Compared with the other implement, cell handover can be completed without increasing a delay.

In addition, in other implement, when PCI confusion occurs, the base station configures a parameter for the UE to read a CGI. This may result in a reading failure risk and cause a handover failure. However, in this embodiment of the present invention, a neighboring base station (in this case, the neighboring base station is the target base station) reports the location information of the UE to the serving base station after detecting the location information of the UE, thereby avoiding a handover failure caused by a possible CGI reading failure. Therefore, a handover success rate can be improved.

Scenario 2:

FIG. 4 is a schematic interaction diagram of a cell handover method according to another embodiment of the present invention. As shown in FIG. 4, the method includes the following steps.

301. A macro base station sends configuration information to a control node.

It should be understood that, in this embodiment of the present invention, the control node may be an access gateway (AC) or a virtual eNB. This is not limited in this embodiment of the present invention.

Similar to the descriptions in the scenario 1, the configuration information may be pre-stored in the control node; or the configuration information may be sent by the macro base station to the control node after the macro base station receives a handover request sent by UE; or the configuration information is pre-stored by the control node, but when the configuration information configured by the macro base station is changed, the macro base station sends reconfigured configuration information to the control node. This is not limited in this embodiment of the present invention.

302. The control node sends the configuration information to each micro base station.

The configuration information is used to indicate a time-frequency resource used when the UE sends an SRS signal to the macro base station. For the configuration information, reference may be made to the foregoing descriptions. Details are not described herein again.

It should be understood that "each micro base station" herein includes all micro base stations within a coverage area of a macro cell corresponding to the macro base station. In other words, "each micro base station" includes base stations corresponding to all neighboring cells of the macro cell.

303. The micro base station performs SRS signal detection on a time-frequency resource indicated by the configuration information.

The micro base station (including a target micro base station) performs SRS signal detection in an SRS timeslot of the macro base station. If the SRS signal is received, it indicates that "the UE is approaching". If no SRS signal is received, it indicates that "the UE has left" or "the UE is still far away".

304. The control node receives location information of UE sent by a target micro base station.

Optionally, the target micro base station may send the location information of the UE to the macro base station, and the macro base station forwards the location information of the UE to the control node. In FIG. 4, description is provided by using only an example in which the target micro base station directly sends the location information of the UE to the control node. This embodiment of the present invention sets no limitation thereto.

305. The macro base station receives a measurement report sent by the UE, where the measurement report carries a PCI of a target cell.

It should be understood that, before the macro base station receives a measurement report sent by the UE in step 305, the macro base station needs to send a handover measurement instruction to the UE, to instruct the UE to perform neighboring cell measurement. After performing the neighboring cell measurement, the UE sends a measurement report to the macro base station, where the measurement report carries the PCI of the target cell.

It should be noted that, the UE may send a measurement report to the macro base station periodically or based on an event. A report process is similar to that in the other implement, and details are not described herein.

306. The macro base station sends the PCI of the target cell to the control node.

Similar to step 304, in FIG. 4, description is provided by using only an example in which the macro base station sends the PCI to the control node after receiving the PCI of the target cell reported by the UE. Obviously, the UE may alternatively directly send the PCI of the target cell to the control node.

307. The control node determines the target cell based on the location information of the UE sent by the target micro base station and the PCI of the target cell.

The control node first determines a plurality of cells (including the target cell) corresponding to the PCI, and then determines, from the plurality of cells with reference to the location information of the UE, a cell that the UE is approaching as the target cell.

After determining the target cell, the control node sends a handover instruction to the target cell, to complete cell handover.

It should be understood that the macro base station in FIG. 3 and FIG. 4 is an example of the first base station according to the embodiments of the present invention. The target micro base station is an example of a target second base station in the embodiments of the present invention. Correspondingly, the macro cell is an example of a first cell, and the plurality of cells corresponding to the plurality of micro base stations are an example of the plurality of second cells according to the embodiments of the present invention.

It should be noted that the foregoing uses only the scenario 1 and the scenario 2 as examples to describe the cell handover method in this embodiment of the present invention. This should not be construed as any limitation on the protection scope of the embodiments of the present invention. Application of the cell handover method in this embodiment of the present invention in another application scenario should also fall within the protection scope of the embodiments of the present invention.

According to the cell handover method in this embodiment of the present invention, the base station can correctly determine the target cell from the plurality of cells with the same PCI by determining the location of the user equipment, without additional signaling exchange. Therefore, when PCI confusion occurs, cell handover can be completed without increasing a delay.

The foregoing details the cell handover method in the embodiments of the present invention with reference to FIG. 1 to FIG. 4. The following describes a base station and a control node used for cell handover in the embodiments of the present invention with reference to FIG. 5 to FIG. 7.

Figure 5:
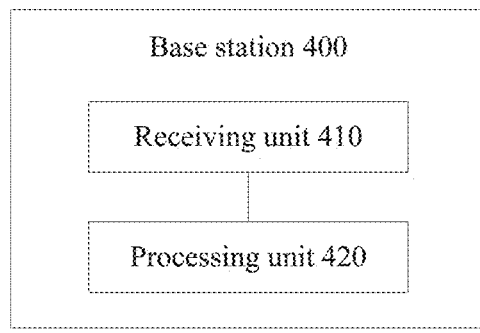
FIG. 5 is a schematic block diagram of a base station according to an embodiment of the present invention.

FIG. 5 is a schematic diagram of a base station 400 according to an embodiment of the present invention. As shown in FIG. 5, the base station 400 includes:

a receiving unit 410, configured to receive a handover request sent by UE, where the handover request is used to indicate that the UE requests to be handed over to a target second cell of at least two second cells, and the handover request carries a physical cell identifier PCI of the target second cell; and a processing unit 420, configured to determine that the PCI is corresponding to a plurality of second cells; where the receiving unit 410 is further configured to receive location information of the UE sent by a target second base station of at least two second base stations that is corresponding to the target second cell, where the location information is obtained by the target second base station based on the configuration information; and the processing unit 420 is further configured to determine the target second cell from the plurality of second cells based on the location information.

The foregoing and other operations or functions of units in the base station 400 in this embodiment of the present invention are used to implement a corresponding procedure performed by the first base station in the cell handover method in the embodiments of the present invention. For brevity, details are not described herein again.

Therefore, according to the cell handover method in this embodiment of the present invention, when PCI confusion occurs, the target second base station determines a location of the user equipment, and sends the location information of the user equipment to the first base station, so that the first base station can correctly determine the target cell. Because no additional signaling exchange is required, a cell handover can be implemented without increasing a delay.

Figure 6:
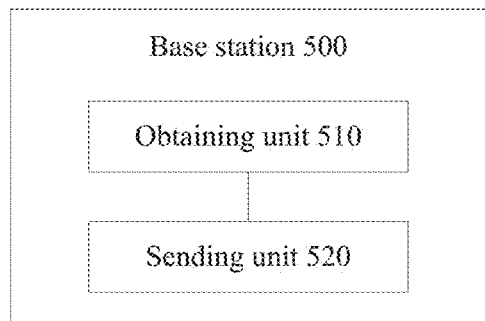
FIG. 6 is a schematic block diagram of a base station according to another embodiment of the present invention.

FIG. 6 is a schematic diagram of a base station 500 according to an embodiment of the present invention. As shown in FIG. 6, the base station 500 includes:

an obtaining unit 510, configured to obtain location information of UE based on configuration information; and a sending unit 520, configured to send the location information to a first base station, so that after receiving a handover request sent by the UE, the first base station determines, based on the location information from a plurality of second cells corresponding to a physical cell identifier PCI of a target second cell carried in the handover request, the target second cell to which the UE needs to be handed over, where the base station is a base station of at least two base stations that is corresponding to the target second cell.

The foregoing and other operations or functions of units in the base station 500 in this embodiment of the present invention are used to implement a corresponding procedure performed by the target second base station in the embodiments of the present invention. For brevity, details are not described herein again.

Therefore, according to the cell handover method in this embodiment of the present invention, when PCI confusion occurs, the target second base station determines a location of the user equipment, and sends the location information of the user equipment to the first base station, so that the first base station can correctly determine the target cell. Because no additional signaling exchange is required, a cell handover can be implemented without increasing a delay.

Figure 7:
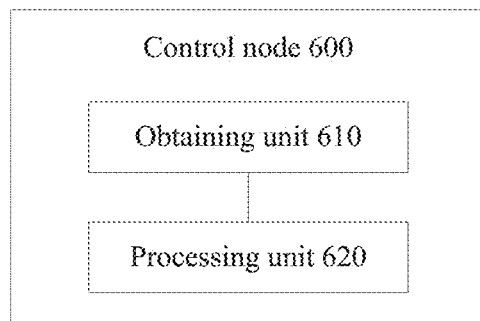
FIG. 7 is a schematic block diagram of a control node according to still another embodiment of the present invention.

FIG. 7 is a schematic diagram of a control node 600 according to an embodiment of the present invention. As shown in FIG. 7, the control node 600 includes:

an obtaining unit 610, configured to obtain a handover request, where the handover request is used to indicate that UE requests to be handed over to a target second cell of at least two second cells, and the handover request carries a physical cell identifier PCI of the target second cell; and a processing unit 620, configured to determine that the PCI is corresponding to a plurality of second cells; where the obtaining unit 610 is further configured to obtain location information of the UE; and the processing unit 620 is further configured to determine the target second cell from the plurality of second cells based on the location information.

The foregoing and other operations or functions of units in the control node 600 in this embodiment of the present invention are used to implement a corresponding procedure performed by the control node in the embodiments of the present invention. For brevity, details are not described herein again.

Therefore, according to the cell handover method in this embodiment of the present invention, when PCI confusion occurs, a target second base station determines a location of the user equipment, and sends the location information of the user equipment to the control node, so that the control node can correctly determine the target cell. Because no additional signaling exchange is required, a cell handover can be implemented without increasing a delay.

The foregoing details the cell handover method in the embodiments of the present invention with reference to FIG. 5 to FIG. 7. The following describes a base station and a control node in the embodiments of the present invention with reference to FIG. 8 to FIG. 10.

Figure 8:
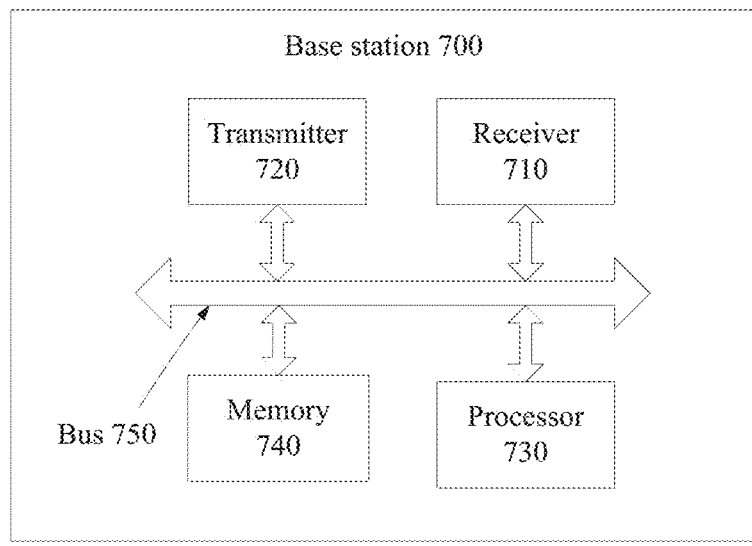
FIG. 8 is a schematic structural diagram of a base station according to an embodiment of the present invention.

FIG. 8 is a schematic structural diagram of a base station 700 according to an embodiment of the present invention. The base station 700 is configured in a communications system including at least two second base stations and user equipment UE, where the base station is corresponding to a first cell, the first cell is a serving cell of the UE, the at least two second base stations are corresponding to at least two second cells, the at least two second cells are neighboring cells of the first cell, the at least two second cells are in one-to-one correspondence with at least two cell global identities CGIs, each CGI is used to uniquely identify a corresponding second cell in the communications system, each second base station stores configuration information, and the configuration information is used to indicate a time-frequency resource used when the UE sends a sounding reference signal SRS to the base station. As shown in FIG. 8, the base station 700 includes a receiver 710, a transmitter 720, a processor 730, a memory 740, and a bus system 750. The receiver 710, the transmitter 720, the processor 730, and the memory 740 are connected by using the bus system 750. The memory 740 is configured to store an instruction, and the processor 730 is configured to execute the instruction stored in the memory 740, to control the receiver 710 to receive a signal and control the transmitter 720 to send a signal.

The receiver 710 is configured to receive a handover request sent by the UE, where the handover request is used to indicate that the UE requests to be handed over to a target second cell of the at least two second cells, and the handover request carries a physical cell identifier PCI of the target second cell.

The processor 730 is configured to determine that the PCI is corresponding to a plurality of second cells.

The receiver 710 is further configured to receive location information of the UE sent by a target second base station of the at least two second base stations that is corresponding to the target second cell, where the location information is obtained by the target second base station based on the configuration information.

The processor 730 is further configured to determine the target second cell from the plurality of second cells based on the location information.

It should be understood that in this embodiment of the present invention, the processor 730 may be a central processing unit (CPU), or the processor 730 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

The memory 740 may include a read-only memory and a random access memory, and provide an instruction and data to the processor 830. A part of the memory 740 may further include a non-volatile random access memory. For example, the memory 740 may further store device type information.

In addition to a data bus, the bus system 750 may include a power bus, a control bus, a status signal bus, and the like. However, for clear description, various buses are marked as the bus system 750 in the figure.

During implementation, the steps of the foregoing method may be implemented by using an integrated logic circuit of hardware in the processor 730 or by using an instruction in a form of software. The steps of the cell handover method disclosed with reference to the embodiments of the present invention may be directly performed by using a hardware processor, or may be performed by using a combination of hardware in the processor and a software module. The software module may be located in a storage medium mature in the art such as a random access memory, a flash memory, a read-only memory, a programmable read-only memory or electrically erasable programmable memory, or a register. The storage medium is located in the memory 740. The processor 730 reads information in the memory 740 and performs the steps of the foregoing method in combination with the hardware of the processor. To avoid repetition, details are not described herein again.

The foregoing and other operations or functions of units in the base station 700 in this embodiment of the present invention are used to implement a corresponding procedure performed by the first base station in the embodiments of the present invention. For brevity, details are not described herein again.

Therefore, when PCI confusion occurs, the base station in this embodiment of the present invention receives the location information of the user equipment sent by the target second base station, and can correctly determine the target cell. Because no additional signaling exchange is required, a cell handover can be implemented without increasing a delay.

Figure 9:
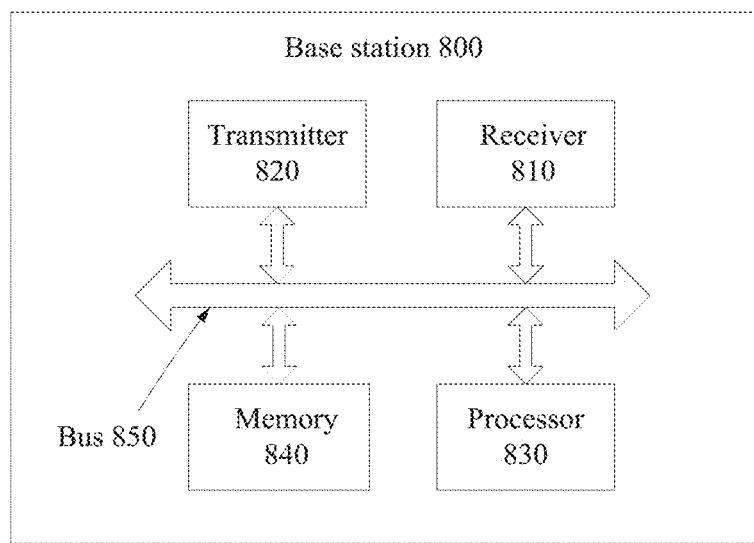
FIG. 9 is a schematic structural diagram of a base station according to another embodiment of the present invention.

FIG. 9 is a schematic structural diagram of a base station 800 according to an embodiment of the present invention. The base station 800 is configured in a communications system including a first base station, at least two base stations, and user equipment UE, where the first base station is corresponding to a first cell, the first cell is a serving cell of the UE, the at least two base stations are corresponding to at least two second cells, the at least two second cells are neighboring cells of the first cell, the at least two second cells are in one-to-one correspondence with at least two cell global identities CGIs, each CGI is used to uniquely identify a corresponding second cell in the communications system, each base station stores configuration information, and the configuration information is used to indicate a time-frequency resource used when the UE sends a sounding reference signal SRS to the first base station. As shown in FIG. 9, the base station 800 includes a receiver 810, a transmitter 820, a processor 830, a memory 840, and a bus system 850. The receiver 810, the transmitter 820, the processor 830, and the memory 840 are connected by using the bus system 850. The memory 840 is configured to store an instruction, and the processor 830 is configured to execute the instruction stored in the memory 840, to control the receiver 810 to receive a signal and control the transmitter 820 to send a signal.

The processor 830 is configured to obtain location information of the UE based on the configuration information.

The transmitter 820 is configured to send the location information to the first base station, so that after receiving a handover request sent by the UE, the first base station determines, based on the location information from a plurality of second cells corresponding to a physical cell identifier PCI of a target second cell carried in the handover request, the target second cell to which the UE needs to be handed over, where the target second cell is a base station of the at least two second base stations that is corresponding to the target second cell.

It should be understood that in this embodiment of the present invention, the processor 830 may be a central processing unit (CPU), or the processor 830 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

The memory 840 may include a read-only memory and a random access memory, and provide an instruction and data to the processor 830. A part of the memory 840 may further include a non-volatile random access memory. For example, the memory 840 may further store device type information.

In addition to a data bus, the bus system 850 may include a power bus, a control bus, a status signal bus, and the like. However, for clear description, various buses are marked as the bus system 850 in the figure.

During implementation, the steps of the foregoing method may be implemented by using an integrated logic circuit of hardware in the processor 830 or by using an instruction in a form of software. The steps of the cell handover method disclosed with reference to the embodiments of the present invention may be directly performed by using a hardware processor, or may be performed by using a combination of hardware in the processor and a software module. The software module may be located in a storage medium mature in the art such as a random access memory, a flash memory, a read-only memory, a programmable read-only memory or electrically erasable programmable memory, or a register. The storage medium is located in the memory 840. The processor 830 reads information in the memory 840 and performs the steps of the foregoing method in combination with the hardware of the processor. To avoid repetition, details are not described herein again.

The foregoing and other operations or functions of units in the base station 800 in this embodiment of the present invention are used to implement a corresponding procedure performed by the target second base station in the embodiments of the present invention. For brevity, details are not described herein again.

Therefore, when PCI confusion occurs, the base station in this embodiment of the present invention determines a location of the user equipment, and sends the location information of the user equipment to the first base station, so that the first base station can correctly determine the target cell. Because no additional signaling exchange is required, a cell handover can be implemented without increasing a delay.

Figure 10:
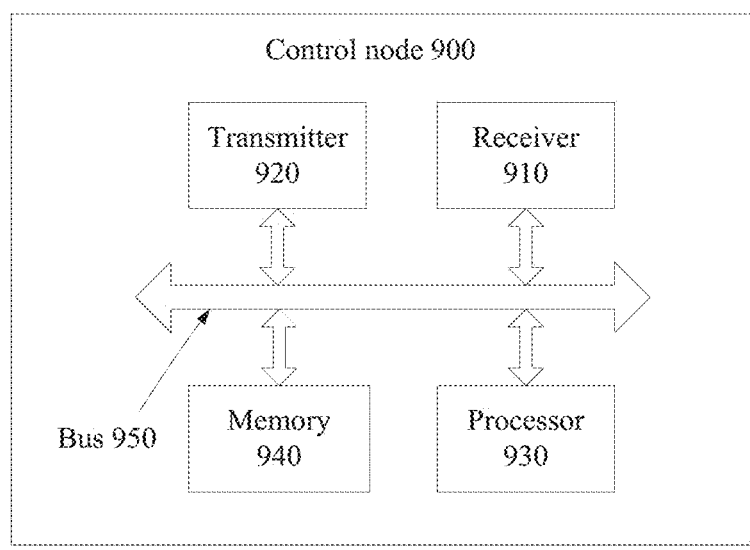
FIG. 10 is a schematic structural diagram of a control node according to still another embodiment of the present invention.

FIG. 10 is a schematic structural diagram of a control node 900 according to an embodiment of the present invention. The control node 900 is configured in a communications system including a first base station, at least two second base stations, and user equipment UE, where the first base station is corresponding to a first cell, the first cell is a serving cell of the UE, the at least two second base stations are corresponding to at least two second cells, the at least two second cells are neighboring cells of the first cell, the at least two second cells are in one-to-one correspondence with at least two cell global identities CGIs, each CGI is used to uniquely identify a corresponding second cell in the communications system, each second base station stores configuration information, and the configuration information is used to indicate a time-frequency resource used when the UE sends a sounding reference signal SRS to the first base station. As shown in FIG. 10, the control node 900 includes a receiver 910, a transmitter 920, a processor 930, a memory 940, and a bus system 950. The receiver 910, the transmitter 920, the processor 930, and the memory 940 are connected by using the bus system 950. The memory 940 is configured to store an instruction, and the processor 930 is configured to execute the instruction stored in the memory 940, to control the receiver 910 to receive a signal and control the transmitter 920 to send a signal. The receiver 910 is configured to receive a handover request, where the handover request is used to indicate that the UE requests to be handed over to a target second cell of the at least two second cells, and the handover request carries a physical cell identifier PCI of the target second cell.

The processor 930 is configured to determine that the PCI is corresponding to a plurality of second cells.

The receiver 910 is further configured to receive location information of the UE.

The processor 930 is further configured to determine the target second cell from the plurality of second cells based on the location information.

It should be understood that in this embodiment of the present invention, the processor 930 may be a central processing unit (CPU), or the processor 930 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

The memory 940 may include a read-only memory and a random access memory, and provide an instruction and data to the processor 930. A part of the memory 940 may further include a non-volatile random access memory. For example, the memory 940 may further store device type information.

In addition to a data bus, the bus system 950 may include a power bus, a control bus, a status signal bus, and the like. However, for clear description, various buses are marked as the bus system 950 in the figure.

During implementation, the steps of the foregoing method may be implemented by using an integrated logic circuit of hardware in the processor 930 or by using an instruction in a form of software. The steps of the cell handover method disclosed with reference to the embodiments of the present invention may be directly performed by using a hardware processor, or may be performed by using a combination of hardware in the processor and a software module. The software module may be located in a storage medium mature in the art such as a random access memory, a flash memory, a read-only memory, a programmable read-only memory or electrically erasable programmable memory, or a register. The storage medium is located in the memory 940. The processor 930 reads information in the memory 940 and performs the steps of the foregoing method in combination with the hardware of the processor. To avoid repetition, details are not described herein again.

The foregoing and other operations or functions of units in the control node 900 in this embodiment of the present invention are used to implement a corresponding procedure performed by the control node in the cell handover method in the embodiments of the present invention. For brevity, details are not described herein again.

Therefore, when PCI confusion occurs, the control node in this embodiment of the present invention can correctly determine the target cell by obtaining the location information of the UE. Because no additional signaling exchange is required, a cell handover can be implemented without increasing a delay.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the other implement, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM,), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A cell handover method, applied to a communications system comprising a first base station, at least two second base stations, and user equipment (UE), wherein the first base station is corresponding to a first cell, the first cell is a serving cell of the UE, the at least two second base stations are corresponding to at least two second cells, the at least two second cells are neighboring cells of the first cell, the at least two second cells are in one-to-one correspondence with at least two cell global identities (CGIs), each CGI is used to uniquely identify a corresponding second cell in the communications system, each second base station stores configuration information, the configuration information is used to indicate a time-frequency resource used when the UE sends a sounding reference signal (SRS) to the first base station, and the method comprises:
   receiving, by the first base station, a handover request sent by the UE, wherein the handover request is used to indicate that the UE requests to be handed over to a target second cell of the at least two second cells, and the handover request carries a physical cell identifier (PCI) of the target second cell;
   determining, by the first base station, that the PCI is corresponding to a plurality of second cells;
   receiving, by the first base station, location information of the UE sent by a target second base station of the at least two second base stations that is corresponding to the target second cell, wherein the location information is obtained by the target second base station based on the configuration information; and
   determining, by the first base station, the target second cell from the plurality of second cells based on the location information.

2. The method according to claim 1, wherein the location information carries a CGI of the target second cell, and
   the determining, by the first base station, the target second cell from the plurality of second cells based on the location information comprises:
   determining, by the first base station, the target second cell from the plurality of second cells based on the CGI.

3. The method according to claim 1, wherein before the receiving, by the first base station, location information of the UE sent by a target second base station of the at least two second base stations that is corresponding to the target second cell, the method further comprises:
   sending, by the first base station, configuration information to the target second base station, so that the target second base station obtains the location information of the UE based on the configuration information, and sends the location information to the first base station.

4. A cell handover method, applied to a communications system comprising a control node, a first base station, at least two second base stations, and user equipment (UE), wherein the first base station is corresponding to a first cell, the first cell is a serving cell of the UE, the at least two second base stations are corresponding to at least two second cells, the at least two second cells are neighboring cells of the first cell, the at least two second cells are in one-to-one correspondence with at least two cell global identities (CGIs), each CGI is used to uniquely identify a corresponding second cell in the communications system, each second base station stores configuration information, the configuration information is used to indicate a time-frequency resource used when the UE sends a sounding reference signal (SRS) to the first base station, and the method comprises:
   obtaining, by the control node, a handover request, wherein the handover request is used to indicate that the UE requests to be handed over to a target second cell of the at least two second cells, and the handover request carries a physical cell identifier (PCI) of the target second cell;
   determining, by the control node, that the PCI is corresponding to a plurality of second cells;
   obtaining, by the control node, location information of the UE; and
   determining, by the control node, the target second cell from the plurality of second cells based on the location information.

5. The method according to claim 4, wherein the location information carries a CGI of the target second cell, and
   the determining, by the control node, the target second cell from the plurality of second cells based on the location information comprises:
   determining, by the control node, the target second cell from the plurality of second cells based on the CGI.

6. A base station, configured in a communications system comprising at least two second base stations and user equipment (UE), wherein the base station is corresponding to a first cell, the first cell is a serving cell of the UE, the at least two second base stations are corresponding to at least two second cells, the at least two second cells are neighboring cells of the first cell, the at least two second cells are in one-to-one correspondence with at least two cell global identities (CGIs), each CGI is used to uniquely identify a corresponding second cell in the communications system, each second base station stores configuration information, the configuration information is used to indicate a time-frequency resource used when the UE sends a sounding reference signal (SRS) to the base station, and the base station comprises:
- a transceiver, configured to receive a handover request sent by the UE, wherein the handover request is used to indicate that the UE requests to be handed over to a target second cell of the at least two second cells, and the handover request carries a physical cell identifier (PCI) of the target second cell; and
- a processor and a non-transitory computer-readable storage medium storing a program to be executed by the processor,
- the processor configured to determine that the PCI is corresponding to a plurality of second cells; wherein
- the transceiver, configured to receive location information of the UE sent by a target second base station of the at least two second base stations that is corresponding to the target second cell, wherein the location information is obtained by the target second base station based on the configuration information; and
- the processor, configured to determine the target second cell from the plurality of second cells based on the location information.

7. The base station according to claim 6, wherein the location information carries a CGI of the target second cell, and
- the processor, configured to determine the target second cell from the plurality of second cells based on the CGI of the target second cell.

8. The base station according to claim 6, wherein the base station further comprises:
- a transceiver, configured to: before the receiving unit receives the location information of the UE sent by the target second base station of the at least two second base stations that is corresponding to the target second cell, send configuration information to the target second base station, so that the target second base station obtains the location information of the UE based on the configuration information, and sends the location information to the base station.

* * * * *